(12) United States Patent
Bravo-Abad et al.

(10) Patent No.: US 9,046,647 B2
(45) Date of Patent: Jun. 2, 2015

(54) THREE-DIMENSIONAL PERIODIC DIELECTRIC STRUCTURES HAVING PHOTONIC DIRAC POINTS

(71) Applicants: Jorge Bravo-Abad, Madrid (ES); John D. Joannopoulos, Belmont, MA (US); Marin Soljacic, Belmont, MA (US)

(72) Inventors: Jorge Bravo-Abad, Madrid (ES); John D. Joannopoulos, Belmont, MA (US); Marin Soljacic, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 224 days.

(21) Appl. No.: 13/769,954

(22) Filed: Feb. 19, 2013

(65) Prior Publication Data

US 2013/0279850 A1    Oct. 24, 2013

Related U.S. Application Data

(60) Provisional application No. 61/635,409, filed on Apr. 19, 2012.

(51) Int. Cl.
  *G02B 6/12*    (2006.01)
  *G02B 6/122*   (2006.01)
  *G02B 1/00*    (2006.01)

(52) U.S. Cl.
  CPC ...... *G02B 6/1225* (2013.01); *G02B 2006/1213* (2013.01); *G02B 1/005* (2013.01)

(58) Field of Classification Search
  CPC .................. G02B 1/005; G02B 2006/1213
  See application file for complete search history.

(56) References Cited

U.S. PATENT DOCUMENTS

2002/0041749 A1 *    4/2002    Johnson et al. ............... 385/129

OTHER PUBLICATIONS

C. T. Chan et al., "Dirac cone and double zero materials," AIP Conf. Proc. 1398, 21 (2011); doi 10.1063/1.3644199.
Charles J Choi et al., "Surface-enhanced Raman nanodomes," Nanotechnology 21 415301 (Sep. 13, 2010) doi:10.1088/0957-4484/21/41/415301.
H. Altug et al., "Experimental demonstration of the slow group velocity of light in two-dimensional coupled photonic crystal microcavity arrays," Applied Letters Physics, vol. 86, pp. 111102-1-111102-3 (2005).
J. Bravo-Abad, J. D. Joannopoulos, and M. Soljacic, "Enabling single-mode behavior over large areas with photonic Dirac cones," Proceedings of the National Academy of Sciences of the United States of America, vol. 109, Issue 25, pp. 9761-9765, DOI: 10.1073/pnas.1207335109 (Jun. 19, 2012).

(Continued)

*Primary Examiner* — Jerry Rahll
(74) *Attorney, Agent, or Firm* — Cooley LLP

(57) ABSTRACT

The dielectric, three-dimensional photonic materials disclosed herein feature Dirac-like dispersion in quasi-two-dimensional systems. Embodiments include a face-centered cubic (fcc) structure formed by alternating layers of dielectric rods and dielectric slabs patterned with holes on respective triangular lattices. This fcc structure also includes a defect layer, which may comprise either dielectric rods or a dielectric slab with patterned with holes. This defect layer introduces Dirac cone dispersion into the fcc structure's photonic band structure. Examples of these fcc structures enable enhancement of the spontaneous emission coupling efficiency (the β-factor) over large areas, contrary to the conventional wisdom that the β-factor degrades as the system's size increases. These results enable large-area, low-threshold lasers; single-photon sources; quantum information processing devices; and energy harvesting systems.

18 Claims, 9 Drawing Sheets

(56) References Cited

OTHER PUBLICATIONS

J. Bravo-Abad, J. D. Joannopoulos, M. Soljacic, "Enabling single-mode behavior over large areas with photonic Dirac cones," arXiv:1204.0500 [cond-mat.mes-hall] (Submitted on Apr. 2, 2012).

J. Lee et al., "Observation and Differentiation of Unique High-Q Optical Resonances Near Zero Wave Vector in Macroscopic Photonic Crystal Slabs," Phys. Rev. Lett. 109, 067401 (2012) [5 pages].

K. Sakoda, "Dirac cone in two- and three-dimensional metamaterials," Optics Express, vol. 20, No. 4, pp. 3898-3917 (Feb. 13, 2012; published on-line Feb. 1, 2012).

K. Sakoda, "Double Dirac cones in triangular-lattice metamaterials," Optics Express, vol. 20, No. 9, pp. 9925-9939 (Apr. 23, 2012).

K. Sakoda, "Universality of mode symmetries in creating photonic Dirac cones," J. Opt. Soc. Am. B., vol. 29, No. 10, pp. 2770-2778 (Oct. 2012).

Kent D. Choquette, Dominic F. Siriani, Ansas M. Kasten, et al., "Single Mode Photonic Crystal Vertical Cavity Surface Emitting Lasers," Advances in Optical Technologies, vol. 2012, Article ID 280920, 8 pages, 2012. doi:10.1155/2012/280920.

M. Ibanescu et al., "Ultra-flat bands in two-dimensional photonic crystals," Proc. of SPIE, vol. 6128, 6 pp. (2006).

M. Imada et al., "Coherent two-dimensional lasing action in surface-emitting laser with triangular-lattice photonic crystal structure," Appl. Phys. Lett. 75, 316 (1999); doi: 10.1063/1.124361.

M. Imada, A. Chutinan, S. Noda, and M. Mochizuki, "Multidirectionally distributed feedback photonic crystal lasers," Phys. Rev. B, vol. 65, p. 195306, 2002.

M. Soljacic et al., "Enhancement of nonlinear effects using photonic crystals," Nature Materials, vol. 3, pp. 211-219 (Apr. 2004).

M. Soljacic et al., "Photonic-crystal slow-light enhancement of nonlinear phase sensitivity," J. Opt. Soc. Am. B., vol. 19, No. 9, pp. 2052-2059 (Sep. 2002).

Ofer Shapira, "Nanophotonic structures for enhanced light-matter interaction," presentation at George Washington University on Feb. 16, 2012.

R. A. Sepkhanov, Ya. B. Bazaliy, and C. W. J. Beenakker, "Extremal transmission at the Dirac point of a photonic band structure," Phys. Rev. A 75, 063813 (2007).

S. Fan and J. D. Joannopoulos, "Analysis of guided resonances in photonic crystal slabs," Phys. Rev. B, 65, 235112 (2002).

S. Longhi et al., "X-shaped waves in photonic crystals," Physical Review, vol. 70, pp. 235123-1-235123-7 (2004).

S.-L. Chua et al., "Larger-area single-mode photonic crystal surface-emitting lasers enabled by the accidental Dirac-point," in 2012 IEEE Photonic Conference Proceedings, pp. 346-347, Sep. 23-27, 2012.

W. Kunishi et al., "High-power single-lobed surface-emitting photonic-crystal laser," CLEO/QELS 2006 Conf. Proceedings, pp. 1-2, May 21-26, 2006, doi: 10.1109/CLEO.2006.4627795.

X. Huang et al., "Dirac cones induced by accidental degeneracy in photonic crystals and zero-refractive-index materials," Nature Materials, vol. 10, pp. 582-586 (Aug. 2011).

\* cited by examiner

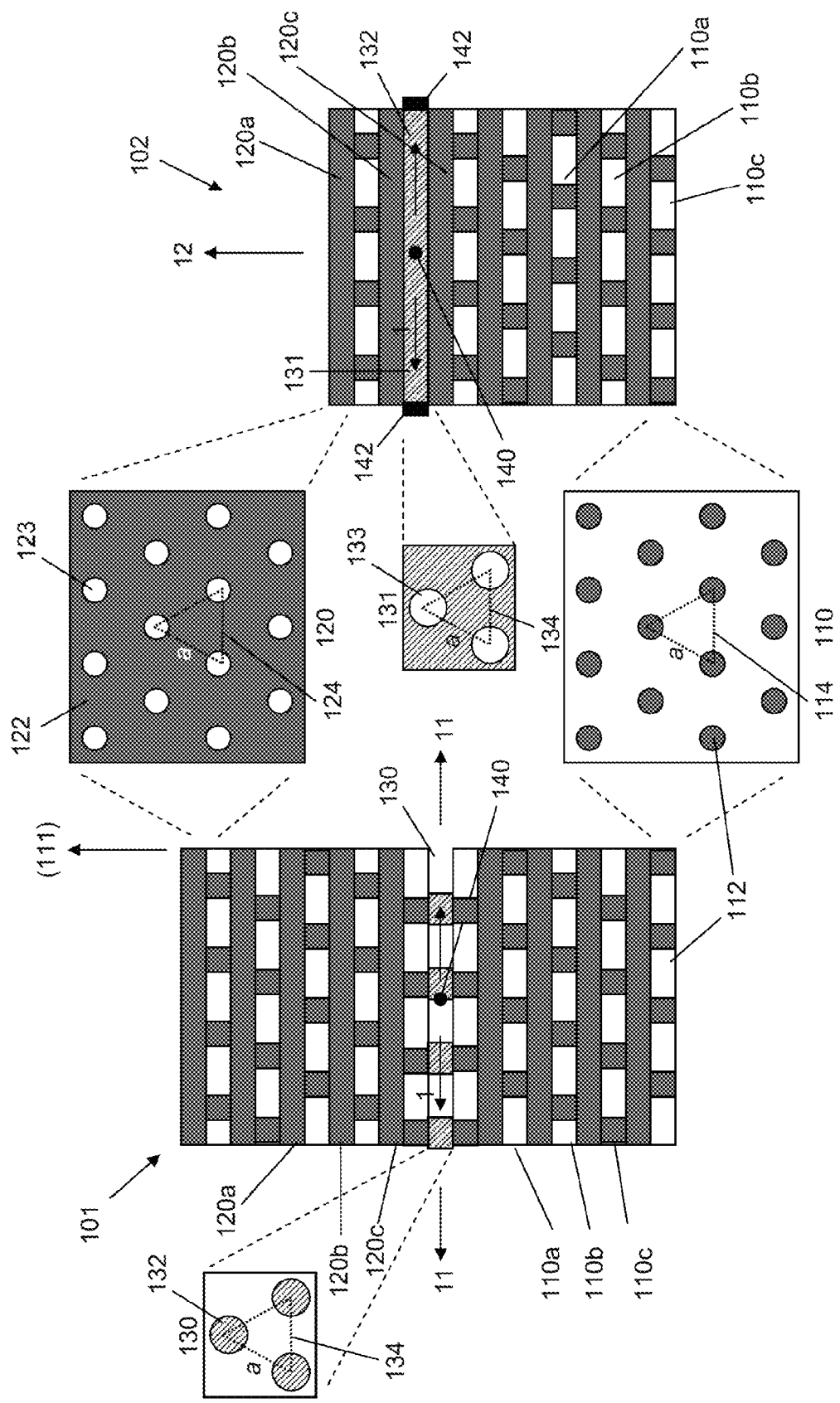

THREE-DIMENSIONAL PERIODIC DIELECTRIC STRUCTURES HAVING PHOTONIC DIRAC POINTS

CROSS-REFERENCE TO RELATED PATENT APPLICATIONS

This application claims the benefit, under 35 U.S.C. §119 (e), of U.S. Provisional Application No. 61/635,409, filed Apr. 19, 2012, which application is hereby incorporated herein by reference in its entirety.

GOVERNMENT SUPPORT

This invention was made with Government support under Contract No. DE-SC0001299 awarded by the Department of Energy, Contract No. DMR-0819762 awarded by the National Science Foundation, and Contract No. W911NF-07-D0004 awarded by the Army Research Office. The Government has certain rights in this invention.

BACKGROUND

Since its isolation from bulk graphite in 2004, graphene, which is a one-atom-thick sheet of carbon, has attracted an increasing amount of interest. As of this writing, the study of the electronic properties of this two-dimensional (2D) material is one of the most active areas of condensed matter physics. This general endeavor has also stimulated new directions in related research fields, especially those originally inspired by the physics of electronic transport in crystalline solids.

For example, the study of graphene has led to work on photonic materials whose dielectric constants are periodically structured at the subwavelength scale—so-called photonic crystals. By exploiting the analogy between the propagation of electrons in graphene and the propagation of photons in suitably designed 2D photonic crystals, phenomena such as directional optical waveguiding, pseudodiffusive transport of light, Klein tunneling, and the observation of the Zitterbewegung of photons have been recently proposed. However, these 2D photonic crystals share a common fundamental drawback: they lack fully omnidirectional out-of-plane light confinement, which has so far prevented the creation of a truly realistic implementation of a photonic counterpart of graphene.

SUMMARY

Embodiments of the present invention include an apparatus, such as a photonic crystal laser or other photonic device, that includes a face-centered cubic (fcc) structure with a photonic band structure that exhibits at least one Dirac cone, which may be separated from the other bands in the fcc structure's photonic band structure. This fcc structure comprises at least one first layer of first dielectric material, at least one second layer of second dielectric material (which may be the same as the first dielectric material), and a defect layer. The first layer includes a plurality of rods whose respective longitudinal axes are oriented along a [111] direction of the fcc structure and are arrayed on a first triangular lattice with a lattice constant a. The second layer includes a plurality of holes whose respective longitudinal axes are also oriented along the [111] direction of the fcc structure and are arrayed on a second triangular lattice having the same lattice constant a as the first triangular lattice. And the defect layer confines an electromagnetic wave along a plane perpendicular to the [111] direction of the fcc structure.

The fcc structure may be configured to emit at least a portion of this electromagnetic wave via a surface parallel to its (111) plane. For example, the fcc structure may emit at least a portion of the electromagnetic wave as a single transverse mode. The fcc structure may also be characterized by at least one lattice vector $(1, 1, \delta)a/2$, $(1, \delta, 1)a/2$, and $(\delta, 1, 1)a/2$, where $|\delta|<0.1$.

The plurality of rods may include at least one rod with a circular cross section, an elliptical cross section, a triangular cross section, a square cross section, a rectangular cross section, or a hexagonal cross section. Similarly, the plurality of holes may include at least one hole with a circular cross section, an elliptical cross section, a triangular cross section, a square cross section, a rectangular cross section, or a hexagonal cross section. The rods and holes may be aligned such that the first triangular lattice is offset from the second triangular lattice.

In some inventive fcc structures, the defect layer that is disposed in contact with either a pair of first layers or a pair of second layers. This defect layer perturbs a periodicity of the fcc structure along a [111] direction of the fcc structure. In addition, the defect layer defines at least one edge configured to couple at least a portion of the electromagnetic wave substantially confined to the defect layer out of the defect layer.

In some embodiments, the apparatus also includes a gain medium, electromagnetically coupled to the defect layer, to emit at least one photon into the defect layer. This gain medium may include a quantum well disposed in the defect layer, a quantum dot disposed in the defect layer, an organic dye molecule disposed in the defect layer, an organic semiconductor disposed in the defect layer, a rare-earth material disposed in the defect layer, or graphene disposed in the defect layer. The gain medium's emission linewidth may be about $\Delta\omega/\omega$, in which case the defect layer's surface area may be about $(\omega/\Delta\omega)^2 a^2$.

In other embodiments, the apparatus includes a waveguide that is disposed in the fcc structure and is electromagnetically coupled to the defect layer. This waveguide couples at least a portion of the electromagnetic wave substantially confined to the defect layer out of the defect layer. Other embodiments may also include a reflector, disposed along at least a portion of an edge of the defect layer, to reflect at least a portion of the electromagnetic wave in a direction substantially perpendicular to the [111] direction of the fcc structure. In some cases, the defect layer and the reflector form a resonator that confines the electromagnetic wave within a (111) plane of the fcc structure.

Still other embodiments of the present invention include a photonic device comprising a photonic crystal that has a photonic band structure characterized by Dirac cone dispersion and, simultaneously, includes at least one layer configured to substantially guide an electromagnetic wave within a plane of the photonic crystal. The Dirac cone dispersion may be isolated from the other bands in the photonic crystal's photonic band structure. Examples of this photonic crystal may have a lattice constant a and a surface area of about $(\omega/\Delta\omega)^2 a^2$, where $\Delta\omega/\omega$ is the linewidth of the electromagnetic wave Yet another embodiment of the present invention includes a method of operating a photon source. Examples of this method include generating at least one photon; coupling this photon into a defect layer in an fcc structure so as to confine the at least one photon along a [111] direction of the fcc structure; and emitting the photon from the fcc structure via a (111) surface of the fcc structure, e.g., as part of a single transverse mode of an electromagnetic wave. In some cases, generating the photon includes emitting the photon from a quantum dot disposed in a defect of the defect layer, a quantum well disposed in electromagnetic communication with the defect layer, an organic dye molecule disposed in electromagnetic communication with the defect layer, a rare-earth material disposed in electromagnetic communication with the defect layer, an organic semiconductor disposed in electromagnetic communication with the defect layer, or graphene disposed in electromagnetic communication with the defect layer. The photon may be confined via reflection at an edge of the defect layer; this reflection may cause the photon to resonate in a cavity at least partially defined by the defect layer.

Still another embodiment includes a method of fabricating a photonic device. This fabrication method includes forming a plurality of first layers comprising at least one first layer having a plurality of rods arrayed on a first triangular lattice characterized by a lattice constant a. It also includes forming a plurality of second layers interleaved with the plurality of first layers so as to form an fcc structure. These second layers may include at least one second layer with a plurality of holes arrayed on a second triangular lattice characterized by the same lattice constant a. In addition, the method includes forming a defect layer in the fcc structure so as to introduce a Dirac cone into a photonic band structure of the fcc structure. This Dirac cone dispersion may be separated from the other bands in the fcc structure's photonic band structure.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. Terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A illustrates an edge-emitting photonic crystal laser according to an embodiment of the present invention.

FIG. 1B illustrates a surface-emitting photonic crystal laser according to an embodiment of the present invention.

DETAILED DESCRIPTION

Figure 1D:
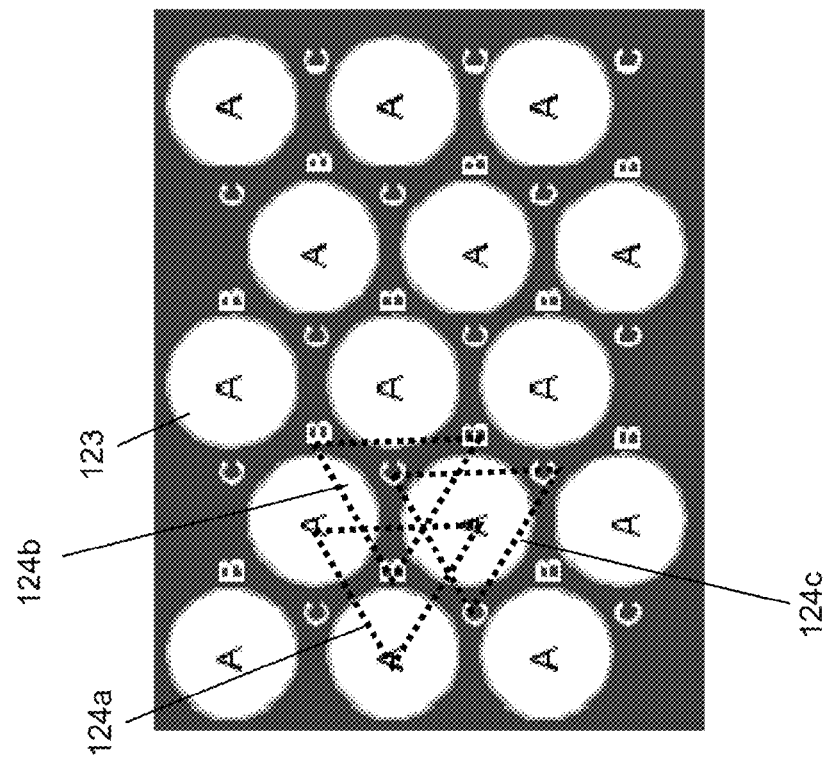
FIG. 1D illustrates the positions of holes in alternating hole (second) layers of the photonic crystal lasers shown in FIGS. 1A and 1B.

Embodiments of the present invention include dielectric, three-dimensional (3D) photonic materials that support quasi-two-dimensional light propagation and, simultaneously, exhibit Dirac cone dispersion. As understood by those of skill in the art, a Dirac cone represents special (linear) dispersion relations in the band structure of a photonic crystal. More specifically, a Dirac cone is formed by two energy bands with linear dispersion, which can be characterized as a linear change in energy E with spatial frequency $k_{x,y}$. The band gap between the linear regions of these energy bands shrinks to nothing, causing the energy bands to touch each other. This intersection point (the conical singularity) is called a Dirac point or Dirac vertex. When viewed from one direction (e.g., the x or y direction), the Dirac point appears at the intersection between the linear portions of the energy bands. The photonic crystal's density of states (DOS) vanishes at the Dirac point.

The inventive photonic crystal materials are particularly suitable for optical device integration. The unique light confining properties of a proper choice of 3D layered photonic crystals enables the creation of extended planar defect modes whose dispersion relation exhibits isolated Dirac points inside a complete 3D photonic band-gap. In the limit in which the emitter frequency virtually coincides with the Dirac point frequency (i.e., the frequency of the Dirac cone vertex) the number of photonic states available to the emitter approaches one, even if the system features a macroscopic area. As a result, the photonic materials disclosed herein enable the implementation of structures much larger than the wavelength, which nevertheless have spontaneous emission coupling factors, or β-factors, close to unity. As understood by those of ordinary skill in the art, the β-factor (or simply β) quantifies the portion of spontaneously emitted photons that couple into a certain targeted mode. Due to the role played by the β-factor in various areas of physics (from optoelectronics to quantum computation to energy harvesting), these materials enable many different types of photonic devices, including lasers, single-photon sources, and energy collection devices (e.g., solar cells).

In other words, the inventive photonic crystal materials exhibit graphene-like properties in the photonic regime. As a result, they can be used to achieve single-mode lasing over large areas. Because laser output power scales with lasing area, this means they can be used to generate single-mode beams with higher power levels than those achievable with other lasers based on photonic crystals FIGS. 1A and 1B illustrate photonic crystal materials according to embodiments of the present invention. FIG. 1A shows a face-centered cubic (fcc) structure 101 formed by interleaving a set of first layers 110a, 110b, and 110c (collectively, first layers 110) with a set of second layers 120a, 120b, and 120c (collectively, second layers 120). Each first layer 110 includes a set of dielectric rods 112 arrayed on a first triangular lattice 114 with a lattice constant α. The lattice constant a may range from about $0.1\lambda$ to about $\lambda$ (e.g., about $\lambda/2$), where $\lambda$ is the wavelength of electromagnetic wave emitted by a source 140 inside the fcc structure 101. For photonic devices, $\lambda$ may range from about 400 nm to about 1600 nm (e.g., about 980 nm, about 1310 nm, or about 1550 nm), which suggests that a may range from about 40 nm to about 1600 nm.

Note that the lattice does not have to be perfect; rather, it may be characterized by at least one lattice vector that is a little longer or shorter than the others. Quantitatively, the fcc structure may be described by at least one of the following lattice vectors: $(1, 1, \delta)\alpha/2$, $(1, \delta, 1)\alpha/2$, and $(\delta, 1, 1)\alpha/2$, where $|\delta|<0.1$.

The rods 112 in the first layers 110 may be made of silicon, silica, germanium, or any other suitable dielectric material. The rods 112 may be surrounded by air or another fluid or by a dielectric material with an index lower than that of the rods 112 themselves. The rods 112 may have any suitable cross section (e.g., circular, triangular, square, rectangular, pentagonal, hexagonal, octagonal, etc.) and diameters that range from about $0.01\alpha$ to about $0.5\alpha$. Nothing necessarily limits the thickness of the first layers 110, but the first layer thickness may be chosen to be about $0.01\alpha$ to about $0.5\alpha$, e.g., to support single-mode operation.

Similarly, each second layer 120 includes a dielectric slab 122 made of the same material as the rods 112 in the first layers 110, e.g., silicon, silica, or germanium. This dielectric slab 122 is patterned with holes 123 on a second triangular lattice 124, which has the same lattice constant a as the first lattice constant a. The holes 123 may be filled with air, vacuum, or any other material whose refractive index is lower than that of the dielectric slab, and their diameters may range from about $0.01\alpha$ to about $0.5\alpha$. They may also have any suitable cross section (e.g., circular, triangular, square, rectangular, pentagonal, hexagonal, octagonal, etc.). Like the first layers 110, nothing necessarily limits the thickness of the second layers 110, but the second layer thickness may be chosen to be about $0.01\alpha$ to about $0.5\alpha$, e.g., to support single-mode operation.

Figure 1C:
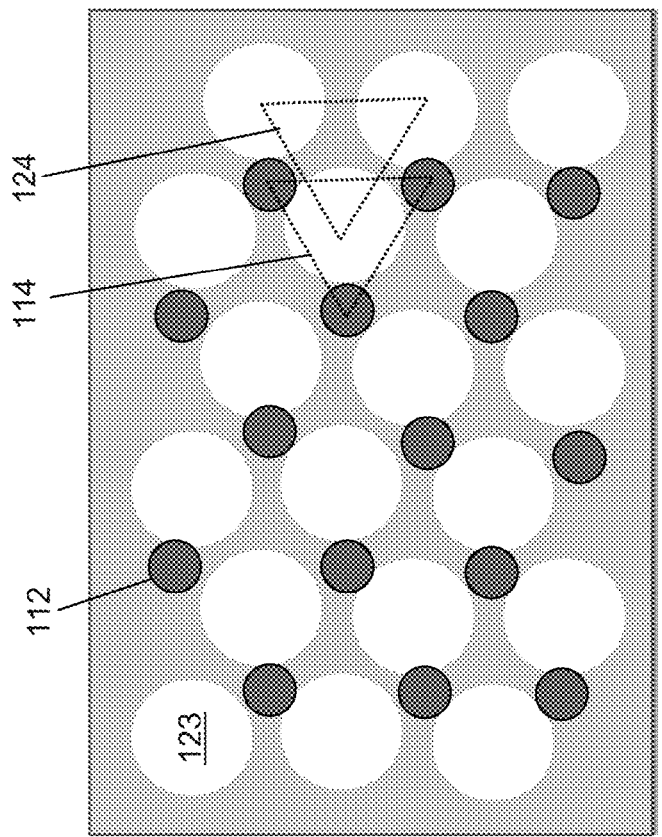
FIG. 1C illustrates the positions of holes and rods in a pair adjacent first and second layers of the photonic crystal lasers shown in FIGS. 1A and 1B.

FIGS. 1C and 1D illustrate the stacking sequence for the first layers 110 and second layers 120. FIG. 1C shows a top view of a consecutive hole-rod layer sequence. The first layers 110 and second layers 120 are stacked on top of each other in alternating fashion such that the first triangular lattice 114 is offset from the second triangular lattice 124 (i.e., so that the rods' centers are shifted with respect to the holes' centers). When stacked on top of each other, the holes' and the rods' longitudinal axes extend along the fcc structure's [111] direction.

Each consecutive hole-rod layer sequence is shifted with respect to the adjacent layer sequences, as shown in FIG. 1D, which illustrates the offsets of the holes 123 in a trio of consecutive second layers 120 (in this case, the sequence second layers 120a, 120b, and 120c shown in FIGS. 1A and 1B). The centers of these holes 123 are labeled "A", "B", and "C" corresponding to second layers 120a, 120b, and 120c, respectively: the second layer 120a has holes 123 with centers at the "A" positions, the next second layer 120b has holes 123 centered at the "B" positions, and the next second layer 120c has holes 123 centered at the "C" positions. Each second layer 120 is shifted laterally by $\alpha/3$ with respect to its nearest neighbors. (The holes 123 in layer 120c are aligned to the rods 112 in the first layer 110a.) The sequence "ABC" repeats with the next second layer 120 as shown in FIGS. 1A and 1B. An exemplary fcc structure 101 may include any number of layers, e.g., three first layers 110 and four second layers 120 (or vice versa), ten first layers 110 and nine second layers 120 (e.g., as shown in FIG. 1A), etc.

The fcc structure 101 also includes a defect layer 130 sandwiched between a pair of second layers 120. (The defect layer 130 could also be sandwiched between a pair of second layers 110.) In FIG. 1A, this defect layer 130 includes dielectric material with rods 132 on a third triangular lattice 134 with the same lattice constant α as the first and second triangular lattices 114, 124; in other embodiments (e.g., as in FIG. 1B), the defect layer may include a dielectric slab with perforated with holes. A thin defect layer 130 (e.g., with a thickness of about $\lambda/4$ or less) supports only one mode—a mode with an almost constant profile—in the [111] direction.

The defect layer's refractive index is larger than the refractive index of the dielectric material in the first layers 110 and second layers 120. The ratio of refractive indices depends on the result of an optimization process which in turn depends on the structure's other parameters and is typically greater than one. For instance, some structures 101 have a ratio of about 1.25 between the refractive index of the defect layer 130 and the rest of the structure 101. In some cases, for example, the defect layer 130 may be formed from germanium, and the first and second layers 110, 120 may be formed from silicon.

Similarly, the rods 132 in the defect layer 130 can be smaller, larger, or the same size as the rods 112 of the first layers 120 (or the holes 123 in the second layers 120). One could fix the size of the rods 132 to a certain value and then optimize the defect layer's height or refractive index to reach satisfactory results. For instance, the radius of the rods 132 could be chosen to be less than half of the lattice period α to prevent overlap.

As explained in greater detail below, this defect layer 130 introduces Dirac cone dispersion into the fcc structure's photonic band structure. As understood by those of ordinary skill in the art, both this Dirac cone and the fcc structure's photonic band structure can be tuned by adjusting the parameters of the photonic crystal. For instance, the rod diameter and shape of the first layers 110, the hole diameter and shape of the second layers 120, the defect layer's size and composition (rods v. holes, material, rod/hole sizes, rod/hole shapes, etc.), the layers' refractive index values, and the lattice constant α can each be selected to achieve the desired Dirac cone and photonic band structure, In addition, the source 140 inside the fcc structure 101 emits an electromagnetic wave 1 at a wavelength $\lambda$ (e.g., 1550 nm). This source 140 is shown in FIG. 1A as a quantum emitter, such as a quantum dot or organic dye molecule, disposed in the defect layer 130. It could also include a quantum well or other suitable emitter electromagnetically coupled to the defect layer 130. For instance, it could also include an organic dye molecule, a rare-earth material, an organic semiconductor, or graphene disposed in electromagnetic communication with the defect layer. Depending on the embodiment, the source 140 can be pumped optically (e.g., with another laser or a lamp) or electrically (e.g., with current supplied by electrodes (not shown)).

The defect layer 130 confines the energy in the electromagnetic wave 1 emitted by the source 140 in the fcc structure's [111] direction. More specifically, the Dirac cone dispersion introduced by the defect layer 130 into the fcc structure's photonic band structure suppresses propagation modes in the [111] direction. As a result, the electromagnetic wave 1 propagates in the plane of the defect layer 130, which is perpendicular to the [111] direction. In this case, the edges of the defect layer 130 emit a portion 11 of the electromagnetic wave 1 in a direction perpendicular to the [111] direction. Thus, the fcc structure 101 shown in FIG. 1A can act as an edge-emitting photonic crystal laser.

In contrast, FIG. 1B shows an fcc structure 102 that acts as a surface-emitting laser. Like the fcc structure 101 shown in FIG. 1A, the fcc structure 102 shown in FIG. 1B includes a plurality of first layers 110 interleaved with a plurality of second layers 120. Each first layer 110 and second layer 120 is as described above with respect to FIG. 1A, and each layer's parameters—hole/rod diameter, lattice constant, thickness, offset, and dielectric material—can be selected as appropriate. Likewise, the number of layers can chosen to achieve the desired confinement and/or photonic band structure.

This fcc structure 102 also includes a defect layer 131 disposed between a pair of second layers 120. (The defect layer 131 could also be disposed between a pair of first layers 110, e.g., as shown in FIG. 1A.) This defect layer 131 includes a plurality of holes 133 arrayed on a third triangular lattice 134 whose lattice constant $\alpha$ is the same as that of the first triangular lattice 114 and the second triangular lattice 124. This third triangular lattice 134 may be aligned either the first triangular lattice 114 or the second triangular lattice 124. It may also be offset from both the first triangular lattice 114 and the second triangular lattice 124. It may also have at thickness of equal to or less than about $\lambda/4$, where $\lambda$ is the wavelength of radiation emitted by the source 140 disposed in the defect layer 130.

As shown in FIG. 1B, the holes 133 in the defect layer 131 may be larger (or smaller) than the rods 112 in the first layers 110. They may also be filled with a dielectric material with a different refractive index than that of the first-layer rods 112. For instance, the first layer 110 and the second layer 120 may be formed from amorphous silicon, and the defect layer 131 may be formed from germanium. The exact size and composition of the defect-layer holes 133 can be tuned to provide the desired Dirac cone dispersion.

FIG. 1B shows that the defect layer 131 confines electromagnetic radiation emitted by the source 140, which may be a quantum dot, organic dye molecule, or any other suitable emitter pumped by an optical or electrical source (not shown) as described above. This electromagnetic radiation forms a wave 1 that propagates in the plane of the defect layer 130 (i.e., in a plane orthogonal to the fcc structure's [111] direction). Reflectors 142, such as metal or dielectric coatings, reflect this wave 1 back towards the source 140, causing the wave 1 to resonate within the defect layer 130.

As understood by those of skill in the art, gain in the source 140 coupled with resonance in the defect layer 130 may cause the fcc structure 102 to lase. In this case, there are relatively few first layers 110 and second layers 120 above the defect layer 130, so a portion of the energy in the resonant wave 1 radiates out through the top of the fcc structure 102. Thus, the fcc structure 102 acts as a photonic crystal, surface-emitting laser.

Figure 1E:
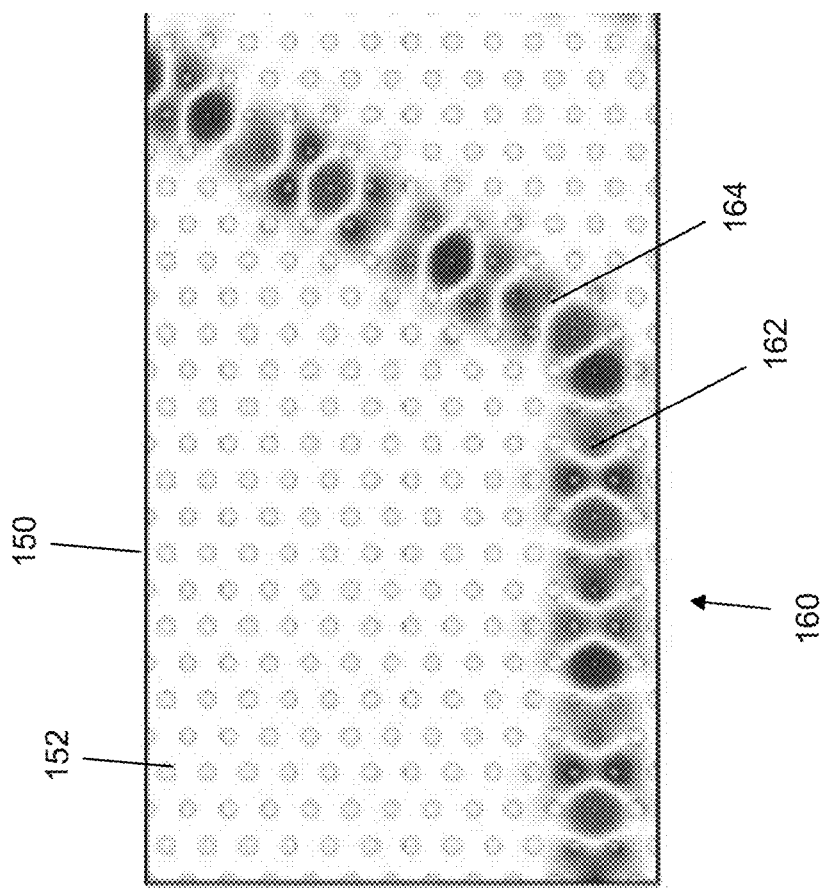
FIG. 1E illustrates a photonic crystal layer suitable for use in a photonic crystal laser for coupling light out of a defect layer according to embodiments of the present invention.

The fcc structure 102 may also include a photonic-crystal waveguide layer 150 that includes a waveguide 160, as shown in FIG. 1E, that couples light from the defect layer 130 out of the fcc structure 101, 102. Like the first layers 110, the waveguide layer 150 includes rods 152 arrayed on a triangular lattice. Some of these rods 162 and 164 have reduced radii and are arrayed to form a line defect 160 that guides light out of the layer 150. This waveguide 160 is quite versatile in that it enables to light extraction from lateral facets (e.g., as in FIG. 1A) and/or from the fcc structure's top or bottom (e.g., as in FIG. 1B).

The radiated energy takes the form of an output beam 12 that propagates in a single longitudinal mode (thanks to the defect layer's thickness of about $\lambda/4$ or less) and a single transverse mode (thanks to the Dirac cone dispersion introduced by the defect layer). Moreover, the surface area over which this output beam 12 is emitted may be relatively large (e.g., on the order of square centimeters), especially compared to the output areas of a conventional photonic crystal laser and of vertical-cavity surface-emitting lasers (VCSELs) and distributed feedback (DFB) lasers. As a result, the output beam 102 may have a much higher intensity than that of an output beam emitted by a conventional photonic crystal laser, a VCSEL, or a DFB laser.

This single-mode operation also leads to a reduction in power consumption by lowering laser's threshold. In some cases, the threshold may be low enough for the laser to be pumped with (possibly concentrated) sunlight or other broadband radiation. Pumping the source 140 with broadband radiation, such as sunlight, causes the fcc structure 102 to act as an energy converter: it converts the broadband (e.g., solar) radiation into single-frequency radiation emitted by the source 140. This monochromatic light could be stored in a resonator, converted into electricity or electrical charge (e.g., using a photovoltaic cell), or used to initiate a chemical reaction.

The fcc structures 101 and 102 shown in FIGS. 1A and 1B, respectively, can also be used for quantum optical processing. For instance, either structure 101, 102 could be used to build a single-photon source (e.g., a squeezed photon source) suitable for quantum optical communication, quantum cryptography, or quantum computing. This could be achieved by selecting the structure's parameters, including its area, such that the structure has a spontaneous emission coupling factor, or $\beta$ factor, that is close to 1 and by pumping the gain medium at low temperatures such that it emits only one photon at a time.

3D Photonic Crystals with Defect Layers

Figure 2B:
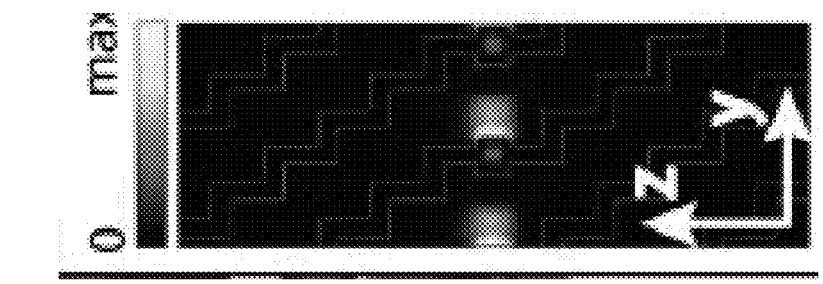
FIG. 2B shows the electric-field intensity corresponding to a guided mode at the Dirac frequency in the defect plane of FIGS. 1A and 2A.
Figure 2A:
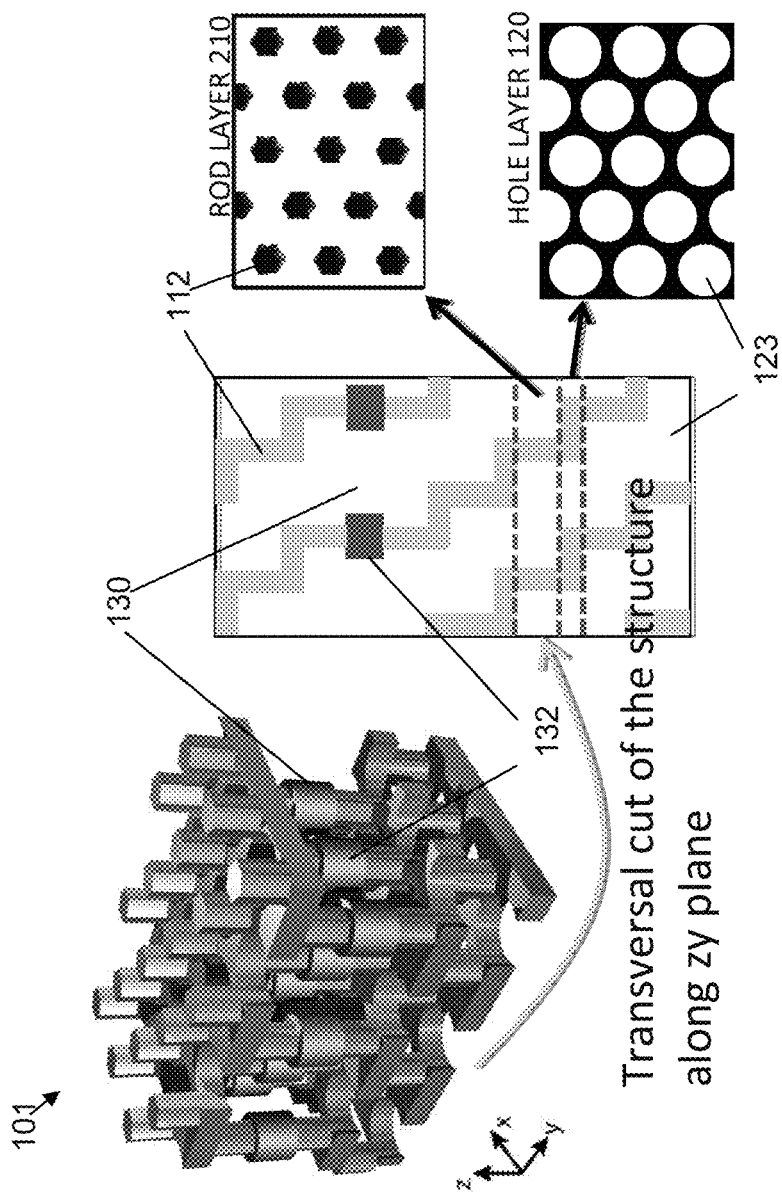
FIG. 2A shows the face-centered cubic (fcc) photonic crystal of FIG. 1A.

FIG. 2 illustrates a perspective view of an exemplary photonic crystal material 200. It is a face-centered cubic (fcc) 3D photonic crystal of low-index (e.g., air) cylinders (holes) embedded in a dielectric background and oriented along the [111] direction with a defect plane (layer) 131. The inset of FIG. 2 shows the electric-field intensity corresponding to a guided mode in the defect plane 131 at the Dirac frequency.

The layered photonic crystals shown in FIG. 2 can be viewed as an alternating stack of two different types of layers. One of the layers has the form of a triangular lattice of finite-height dielectric rods 112 in air (labeled as rod layer 110 in FIG. 2), whereas the other layer can be described as a triangular lattice of air holes 123 milled in a dielectric slab 122 (labeled as hole layer 120 in FIG. 2) as described above with respect to FIGS. 1A and 1B. Each of the two types of layers displays a highly symmetric cross section that mimics a canonical 2D photonic-crystal structure: one is a periodic array of air holes in a dielectric slab, and the other is a periodic array of hexagon-like rods in air. In addition, although neither layer displays a complete (omnidirectional) photonic band gap by itself, stacking the layers periodically as shown in FIG. 2 yields a structure with a large complete photonic band-gap can be obtained using practical values of the refractive index contrast.

The 3D photonic crystal structure 200 shown in FIG. 2 also includes an extended planar electromagnetic defect mode. This defect mode comprises a single defect layer 131 that perturbs the structure's original periodic rod-layer/hole-layer/rod-layer sequence along the [111] direction. In the example shown in FIG. 2, a hole-layer 120 of the structure 200 has been removed and replaced with a triangular lattice of finite-height dielectric rods 132 with circular cross section, whose radius, height and dielectric constant are given by $r_d$, $h_d$ and $\in_d$, respectively.

Introducing line defects into layered 3D photonic crystals of the type described above enables the implementation of localized electromagnetic states whose dispersion relation, field profiles, and polarization correspond closely with those associated with the corresponding 2D photonic crystal geometries. Similarly, the spectral properties of the planar extended states localized in the defect layer rendered in FIG. 2 should, to some extent, inherit properties associated with the Bloch states of the bona-fide 2D counterpart of this defect layer (i.e., those Bloch states that are present in a triangular array of infinitely long high-index rods). On the other hand, the intrinsic symmetry properties of 2D photonic crystals based on a triangular lattice can induce the presence of Dirac points near high-symmetry points of the band structure. This suggests the feasibility of creating a single 3D physical system that features both quasi-two-dimensional light propagation and, simultaneously, Dirac cone dispersion. In addition, the Dirac cone dispersion may be isolated within a given frequency bandwidth, or, equivalently, the Dirac cone may be fully separated from the rest of the bands present in the band structure. Combining all three of these features—quasi-two-dimensional light propagation, Dirac cone dispersion, and the isolation or separation of Dirac cone dispersion from other energy bands—in the same system makes it possible to fully exploit the analogy between electronic and photonic graphene.

Numerical Analysis of 3D Photonic Crystals

Without being bound by any particular theory, the following numerical analysis of photonic band structure as a function of fcc structure parameters illustrates aspects of the inventive concepts. This analysis was performed using the plane-wave expansion method to Maxwell's equations with a supercell large enough in the [111] direction to accurately reproduce the properties of an isolated defect plane in an infinite 3D photonic crystal. These calculations show that, for the optimal structure, the air holes 123 within the hole layer 120 and the equivalent-cylinders 112 in the rod layer 110 are $r_h$=0.41a and $r_c$=0.18α, respectively, where α is the lattice constant of the in-plane triangular lattice defined within each layer as shown in FIG. 2. The thicknesses of the hole and rod layers are $t_h$=0.32α and $t_c$=0.50α, respectively, whereas the refractive index of the high-dielectric material is n=2.5. The low-refractive index of the structure is 1.0. The defect layer of this system features $n_d$=3.1, $t_d$=0.32α, and $h_d$=$t_c$=0.50α.

Figure 3:
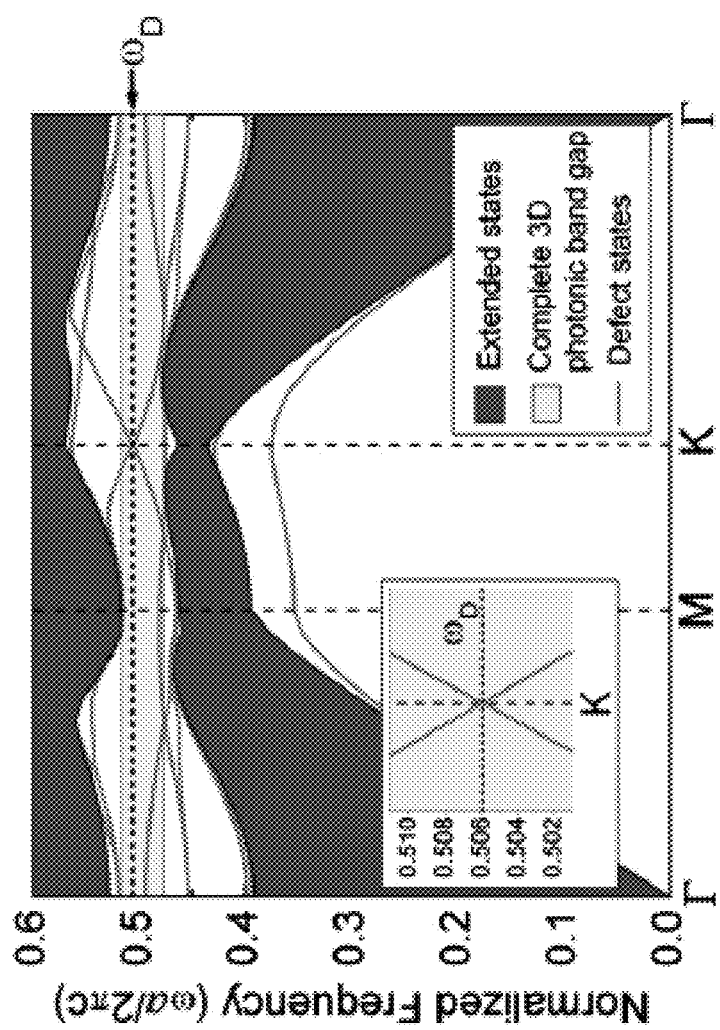
FIG. 3 is a dispersion diagram, corresponding to the fcc structure shown in FIG. 2, projected over the first Brillouin zone of the in-plane triangular lattice characterizing the hole and rod layers of the fcc structure (the inset shows an enlarged view of the dispersion diagram near the Dirac point).

FIG. 3 shows a dispersion diagram for the structure shown in FIG. 2. Shaded violet areas in this figure show the projected band structure for the perfectly periodic 3D photonic crystal (i.e., without the defect layer). The inset of FIG. 3 shows an enlarged view of the dispersion diagram near the Dirac point. In this case, the dispersion diagram was obtained by plotting the frequencies w of the extended bulk states of the system as a function of the in-plane wavevector $k_\parallel$ in the irreducible Brillouin zone of the underlying in-plane 2D triangular lattice. The considered system exhibits a large 3D complete photonic band gap (shaded area), centered at frequency ω=0.497(2πc/α) (c is the light velocity in vacuum) and featuring a gap-midgap ratio of approximately 8%.

FIG. 3 also shows the dispersion relations of the guided modes of the defect plane (solid lines). These defect bands display a Dirac point at $\omega_D$=0.506(2πc/α) (see FIG. 3 and the inset of FIG. 2), lying fully within the omnidirectional photonic-band gap of the periodic system (shaded area in FIG. 3). This Dirac point is isolated from all of the rest of the frequencies of the band structure of the system within a bandwidth Δω=0.026(2πc/α).

The inset of FIG. 2 illustrates the corresponding cross-section along the x-y plane of the electric-field intensity distribution. It shows the strong out-of-plane photonic-band gap confinement of the electromagnetic fields at ω=$\omega_D$. Without being bound by any particular theory, it appears that these results represent a complete photonic analogue of graphene is implemented in a realistic 3D physical system. These results are scalable to many different frequency regimes, and could therefore be used to enhance performance of different classes of active optical devices.

Controlling Light-Matter Interactions with Photonic Crystals

The photonic systems disclosed herein can enable an unprecedented control of light-matter interaction over large areas. For example, consider a point quantum emitter embedded in a photonic crystal as shown in FIGS. 1A and 1B. Suitable point quantum emitters include, but are not limited to quantum dots, (organic) molecules, atoms, etc. The emitter can be modeled as a two-level system, characterized by a transition frequency $\omega_s$, an emission bandwidth (i.e., a transition bandwidth) of $\Delta\omega_s$, and a dipolar transition moment d. The system can be characterized by its spontaneous emission coupling efficiency, the so-called β-factor, which quantifies the portion of all spontaneously emitted photons that couple into a certain targeted mode. Increasing the value of the β-factor may enhance the performance of an active nanophotonic device, such as a single photon emitter, for applications in modern optoelectronics and quantum information processing. Examples of active nanophotonic devices include ultralow-threshold lasers and single photon sources based on photonic crystal cavities.

The β-factor's dependence on the particular electromagnetic environment in which the emitter is embedded can be elucidated by examining its link with the corresponding photonic local density of states (LDOS). For a non-dissipative system, the LDOS can be written as:

$$\rho(r, \hat{d}, \omega) = \sum_v \epsilon(r)|E_v(r) \cdot \hat{d}|^2 \delta(\omega - \omega_v) \quad (1)$$

where the index v labels the different source-free normal solutions to Maxwell's equations obtained for the photonic structure; $E_v(r)$ and $\omega_v$ are the corresponding E-field profile and frequency, respectively; and $\in(r)$ represents the dielectric constant distribution.

Figure 4:
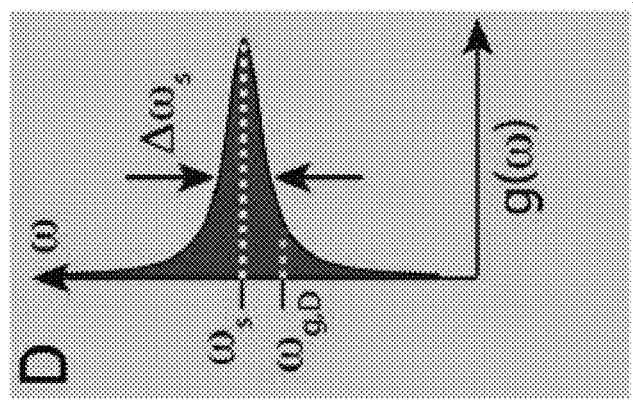
FIG. 4 is a plot of the emission spectrum of a quantum emitter (e.g., as shown in FIGS. 1A and 1B) with a Lorentzian lineshape centered at a frequency $\omega_s$ with a width $\Delta\omega_s$.

From Fermi's golden rule, the spontaneous emission rate of the quantum emitter Γ in 3D is proportional to the LDOS accessible to the emitter $\Gamma=(\pi|d|^2\omega_s\hbar\in_0)\rho(r_s, d, \omega_s)$. Thus, assuming the targeted mode to be a normal mode of the system, $E_t(r)$, of frequency $\omega_t$, one can write the β-factor as:

$$\beta = \frac{\omega_t g(\omega_t)\epsilon(r)|E_t(r)\cdot\hat{d}|^2}{\int d\omega g(\omega)\omega\rho(r_s,\hat{d},\omega)} \quad (2)$$

where $g(\omega)$ is the lineshape of the transition (e.g., as shown in FIG. 4), centered at $\omega_s$ and characterized by full-width, half-maximum (FWHM) of $\Delta\omega_s$. Note that the factor $g(\omega_t)$ $(\omega_t)$ in the numerator accounts for the fact that $\beta$ decreases as the emission frequency is detuned from $\omega_t$. Hereafter, $\omega_t = \omega_s$ is assumed.

Equation (2) shows that the $\beta$-factor can be enhanced by introducing a physical mechanism that minimizes the density of photonic states lying within the transition linewidth. In fact, the large values for $\beta$ reached in subwavelength volume photonic resonators can be viewed as a particular instance of this physical picture. Such nanoresonators are designed to have a volume small enough so that only one resonant mode lies within the transition linewidth. This makes them act as single-mode structures, which as deduced from Eq. (1) leads to values $\beta=1$ (provided that the coupling with the radiation modes existing outside the resonator is negligible).

To gain physical insight into the effect of the Dirac cone dispersion on the $\beta$-factor, consider the magnitude of $\beta$ in the following three cases (all of them 3D): first, the case of a homogeneous material; second, the case in which the dielectric material is periodically structured so that $\omega_s$ lies in the vicinity of the lower edge of a 3D photonic-band gap; and, third, the case of a system exhibiting quasi-two-dimensional light propagation and, simultaneously, an isolated Dirac point near $\omega$ (e.g., the structures displayed in FIGS. 1A, 1B, and 2).

Figure 5:
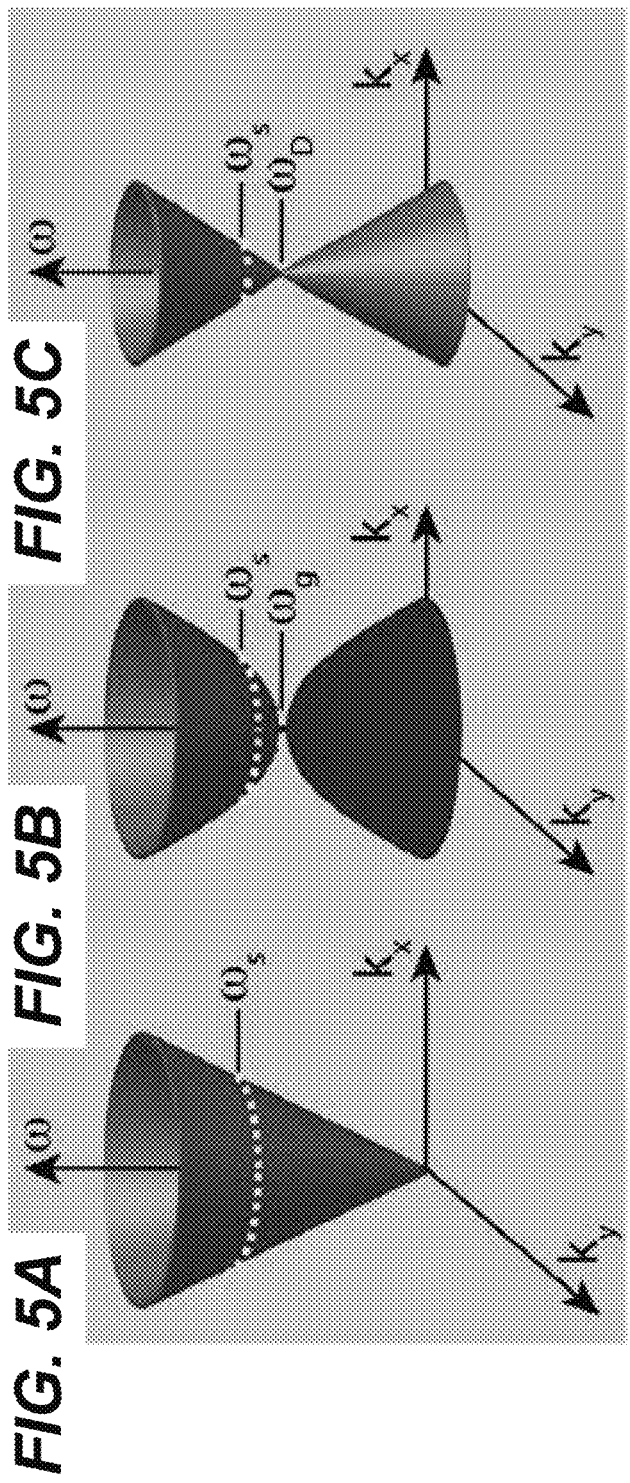
FIGS. 5A-5C illustrate dispersion relations of a homogeneous material, a photonic crystal exhibiting a band gap near the peak of the emission spectrum shown in FIG. 5A, and a photonic crystal exhibiting a Dirac point near the peak of the emission spectrum shown in FIG. 5A, respectively.

FIGS. 5A, 5B, and 5C illustrate the dispersion relations for homogeneous material, material with a 3D photonic band gap, and material exhibiting quasi-two-dimensional light propagation and, simultaneously, an isolated Dirac point near $\omega_s$, respectively. (For simplicity, FIGS. 5A and 5B show only the 2D counterparts of the corresponding cases). In all three cases the electro-magnetic field in the system is assumed to be confined in a finite volume V, such that $V \gg \lambda^3$ (the dependence on volume is addressed below).

The homogeneous case shown in FIG. 5A is characterized by the following dispersion relation: $\omega(k)=ck/n$ (where n is the refractive index and $k=|k|$, with $k=(k_\parallel, k_z)$. By making use of the medium's isotropy, one can derive the following expression for the $\beta$-factor: $\beta=(1/V)\omega_s g(\omega_s)/F_h(\omega)$, where $F_h(\omega)=\int d\omega g(\omega)\omega\rho_h(\omega)$, with $\rho_h(\omega)=(1/2\pi)(n/c)^3\omega^2$. Similarly, for the case of the photonic band-gap shown in FIG. 5B, taking $\omega(k)=\omega_g - A_g k^2$ ($\omega_g$) to be the center of the gap (e.g., as in FIG. 3) one finds that the magnitude of $\beta$ can be calculated using the same expression given above for the homogeneous case but replacing $F_h(\omega)$ by $F_g(\omega)=\int d\omega g(\omega)\omega\rho_g(\omega)$, with $\rho_g(\omega)=(4\pi A_g^{3/2})^{-1}(\omega_g-\omega)^{1/2}$. ($A_g$ is a constant determined from calculations of the band structure; physically, $A_g$ defines the curvature of the dispersion relation close to $\omega_g$.)

For the Dirac case shown in FIG. 5C, the calculation of $\beta$ is more involved than in the previous two cases for a number of reasons. First, an excited dipole embedded in the defect layer displayed in FIG. 2 decays only via the guided modes confined within the layer; the omnidirectional photonic band gap prevents decay into any other modes surrounding the layer (e.g., bulk Bloch modes). Second, for small enough values of $h_d$ (e.g., values small enough for only the fundamental mode guided mode in the z-direction to be excited), the quasi-2D light propagation inside the defect layer can be described by the dispersion relation corresponding to in-plane Bloch states (i.e., states with $k_z=0$): $\omega(k_\parallel)=\omega_D \pm A_D|k_\parallel - k_{\parallel,0}|$. In this expression, $A_D$ is a constant that can be obtained from band-structure calculations and $k_{\parallel,0}$ defines the coordinates in k-space of the Dirac cone vertex, whereas the plus and minus signs correspond to $\omega>\omega_D$ and $\omega<\omega_D$, respectively. (Physically, $A_D$ corresponds to the slope of the Dirac cone.) Thus, the total density of states accessible to the emitter is $\rho_D(\omega)=1/(2\pi A_D^2)|\omega-\omega_D|$. This, in turn, yields the following expression for the SE coupling efficiency $\beta=(1/A)\omega_s g(\omega_s)/F_D(\omega)$, with $F_D(\omega)=\int d\omega g(\omega)\omega\rho_D(\omega)$). Here A is the transversal area of the defect layer (i.e., the total volume of the defect layer is $V=A \times h_d$).

It is possible to quantify the values of $\beta$ for each of the above cases using realistic parameter values. Introducing a renormalized spontaneous emission coupling efficiency $\eta$ makes it possible to compare the different systems directly. In the homogeneous and band-edge cases, this magnitude is defined as $\eta_{h,g}=\beta_{h,g}\times V/\alpha^3$, whereas for the Dirac case it is defined as $\omega_D=\beta_D \times S/\alpha^2$. This normalization makes it possible to ignore $\beta$'s dependence on the systems' sizes, and thus focus exclusively on the photonic properties. It also removes the geometrical factor V/A that enhances the $\beta$-factor in the Dirac case with respect to the other two cases. This geometrical factor stems from the electromagnetic confinement in the z-direction of the guided modes in the Dirac structure, and therefore cannot be ascribed to the Dirac spectrum.

As mentioned above, FIG. 4 is a plot of the transition lineshape used in these calculations. This transition lineshape is described by a Lorenztian centered at $\omega_s=2.1\times10^{15}$ Hz (i.e., an emission wavelength of about 900 nm) and featuring a relative FWHM $\Delta\omega_s/\omega_s=10^{-4}$; values more than one magnitude smaller for the relative FWHM can be reached using, for instance, quantum dots at low temperatures. In the homogeneous case a refractive index $n=n_d$ is chosen, whereas for the band-edge and Dirac cases, the values of the dispersion relation parameters $A_g$ and $A_D$ are taken from band structure calculations: $A_g=1.2\times c\alpha/(2\pi)$ and $A_D=0.3\times 1/c$. The lattice constant $\alpha$ is defined in FIGS. 1A, 1B and 2 and is about equal to 450 nm for an emission wavelength of about 900 nm.

Using these parameters, evaluating the expression for $\beta$ given above yields $\eta_h=68.2$, $\eta_g=4.0\times10^5$ and $\eta_D=3.6\times10^6$. From these values, the Dirac dispersion introduces an enhancement factor of about four orders of magnitude with respect to the homogeneous case and about one order of magnitude with respect to the band-edge case. This enables reaching values of $\beta\approx1$ over macroscopic areas. Physically, the origin of this dramatic increase of $\eta$ (and consequently of $\beta$) can be understood in terms of the rapid decrease of the number of photonic states available to the emitter as its emission frequency approaches the frequency of the Dirac point. In particular, in contrast to the homogeneous and bandedge cases, in the Dirac case when the emission frequency $\omega_s$ approaches the Dirac vertex frequency $\omega_D$, the number of modes accessible to the emitter approaches unity, making the whole structure behave as a single-mode system, even if it features a large area. Note that the LDOS is strictly zero at $\omega_g$ and $\omega_D$ in the band-edge and Dirac cases, respectively. Therefore, in the calculations for each case, $\omega_s$ is assumed to be slightly detuned (by a quantity much smaller than $\omega_s$ and $\Delta\omega_s$) from $\omega_g$ and $\omega_D$.

The enhancement of $\beta$ also depends on the size of the photonic crystal structure. The physical origin of this dependence stems from the fact that it is necessary to account for the discreteness of the eigenmodes in the system for values of the area A that are not necessarily much, much larger than $\lambda^2$. In these cases, the only allowed states are those characterized by a wavevector $k=(k_x, k_y)$ whose value coincides with one of the nodes of the rectangular grid defined by the discrete set of values $\{2\pi n_x/L, 2\pi n_y/L\}$ (with $n_x$ and $n_y$ being arbitrary integers, and where the system is assumed to be square shaped with side length L=√A). Therefore, the influence of these finite-size effects on β can be computed by using the discrete version of Eq. (2).

Figure 6:
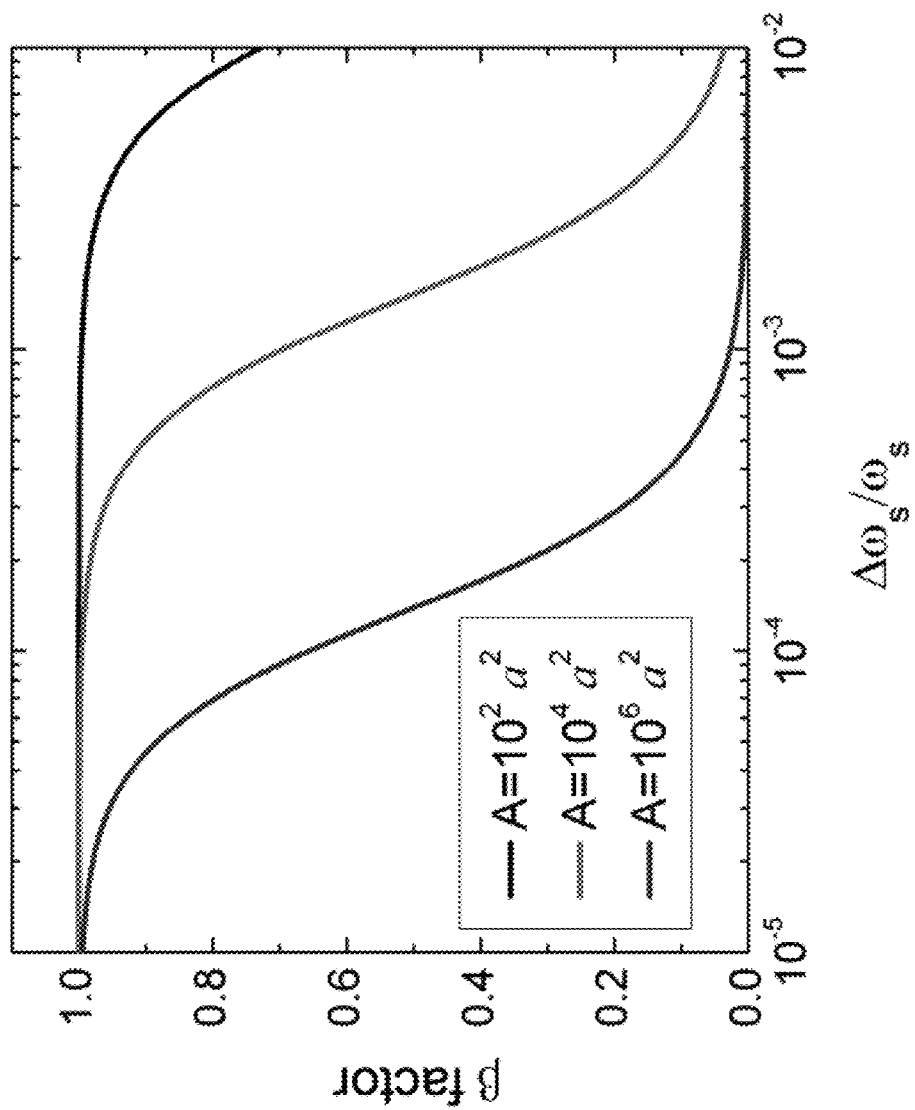
FIG. 6 is a plot of the dependence of the β-factor on the normalized emission linewidth computed for several sizes of the transverse area A of the system, where $\alpha$ is the periodicity of the in-plane triangular photonic crystal as shown in FIG. 2.

FIG. 6 shows the computed results for β as a function of the normalized emission bandwidth $\Delta\omega_s/\omega_s$ for several values of the system's lateral size, ranging from L/α=10 to L/α=10$^3$. As observed, β approaches 1 when $\Delta\omega_s/\omega_s$ approaches the lower limit of the interval displayed in the figure ($\Delta\omega_s/\omega_s$=10$^{-5}$). This is due to the fact that for the system sizes considered in this calculation, this lower-limit linewidth is smaller than the frequency interval between the adjacent modes, and therefore, the structure acts as a single-mode system (much in the same way as occurs in large-β photonic nanocavities). As $\Delta\omega_s/\omega_s$ increases, a growing number of modes enters the interval where g(ω) is not negligible and, therefore, β starts decreasing. Since the frequency interval between adjacent modes is smaller for larger values of A, the decrease of the β factor with $\Delta\omega_s/\omega_s$ starts sooner for larger values of A.

Theoretical Analysis of the β-Factor

Without being bound by any particular theory, this section includes a theoretical treatment of the spontaneous emission coupling efficiency (the β-factor) discussed above. It starts with the derivation of a general expression for the β-factor for the class of structures disclosed herein. Within the Wigner-Weisskopf approximation, the spontaneous emission rate of a two-level quantum emitter embedded in a complex electromagnetic (EM) environment can be described by Fermi's golden rule:

$$\Gamma = \frac{\pi d^2 \omega_s}{3\hbar\epsilon_0} \rho(r_s, \hat{d}, \omega_s) \quad (3)$$

For a non-dissipative system, in which the electric field can be expanded in terms of a complete basis of transverse orthonormal modes $\{E_m(r)\}$ of frequencies $\{\omega_m\}$, the LDOS can be expressed as $$\rho(r, \hat{d}, \omega) = \sum_m \delta(\omega - \omega_m)\epsilon(r)|\hat{d} E_m(r)|^2 \quad (4)$$

where ∈(r) is the position dependent dielectric constant characterizing the system. Each of the modes in Eq. (4) satisfies the following orthonormality condition:

$$\int dr \epsilon(r) E_m(r) E^*_n(r) = \delta_{mn} \quad (5)$$

with $\delta_{nm}$ standing for the Kronecker's delta. The transversality condition reads $$\nabla \cdot [\epsilon(r) E_m(r)] = 0 \quad (6)$$

Note also that each mode profile can be obtained by solving the following wave equation:

$$\nabla \times [\nabla \times E_m(r)] = \mu_0 \epsilon(r) \omega_m^2 E_m(r) \quad (7)$$

where $\mu_0$ is the vacuum permeability.

Now, by definition, the β-factor can be calculated as $\beta = \Gamma_t/\Gamma_{all}$, where $\Gamma_t$ is the spontaneous emission rate into a given targeted mode (often a laser mode) and $\Gamma_{all}$ is the total spontaneous emission rate into all the modes of the system (including the targeted one). Thus, inserting Eq. (4) into Eq. (3) and integrating the resulting expression over angular frequency yields the following expression for $\Gamma_{all}$, corresponding to an emitter located at $r=r_s$:

$$\Gamma_{all} = \frac{\pi d^2 \epsilon(r_s)}{3\hbar\epsilon_0} \int d\omega g(\omega) \omega f(\omega, r_s) \quad (8)$$

where the function f(ω, r) is defined as $$f(\omega, r) = \sum_m \delta(\omega - \omega_m)|\hat{d} \cdot E_m(r)|^2 \quad (9)$$

Equations (8) and (9) summarize the physical origin of the total spontaneous emission decay in the systems disclosed herein: on the one hand, the different terms in the summand of Eq. (9) account for the different modes to which a single frequency component ω of the emission transition can decay. On the other hand, the integral in ω appearing in Eq. (8) accounts for the continuous sum of these possible radiative decay paths for all frequency components of the emission transition. Note that, as expected, the lineshape of the emission, g(ω), acts as a frequency dependent weight in this sum. The additional factor ω multiplying g(ω) in the integral of Eq. (8) comes just from the proportionality factor that links the spontaneous emission rate and the LDOS (see Eq. (3)).

This physical picture of the decay process also makes it possible to obtain an expression for $\Gamma_t$ simply by singling out the contribution to $\Gamma_{all}$ that stems from the targeted mode. In particular, by defining $E_t(r)$ and $\omega_t$ to be the targeted electric-field profile and its corresponding frequency, respectively, the magnitude of $\theta_t$ can be obtained by substituting g(ω) by $g_t(\omega) = \delta(\omega - \omega_t)$ in Eq. (9) and by replacing f(ω, $r_s$) by $f_t(\omega, r) = \delta(\omega - \omega_t)|d E_t(r)|^2$. This yields $$\Gamma_t = \frac{\pi d^2 \epsilon(r_s)}{3\hbar\epsilon_0} \omega_t g(\omega_t) |\hat{d} \cdot E_t(r_s)|^2 \quad (10)$$

Note that dividing Eq. (8) by Eq. (10) and using the definition of the LDOS given in Eq. (4) yields Eq. (3).

This formalism can be used to calculate the β factor in the case in which the emitter is embedded in a three-dimensional photonic crystal (e.g., as shown in FIGS. 1A and 1B). First, assume that the photonic crystal is characterized by a finite volume $V = L_x \times L_y \times L_z$ (where $L_x$, $L_y$, $L_z$ are the dimensions of the photonic crystal along the x, y, and z axes, respectively). In these calculations, this 3D analysis is applied to the homogeneous and band-edge cases discussed above. (The homogeneous case can be considered as a periodic system with an arbitrary periodicity). For the Dirac case, however, due to the out-of-plane, sub-wavelength confinement of the electromagnetic field introduced by the full photonic band gap, the analysis is performed in terms of the in-plane transverse area of the system, $A = L_x \times L_y$, as discussed above.

To analyze the finite-size effects on the β-factor, without loss of generality, assume that the volume V (or transversal area A for the Dirac case) is surrounded by Born-von-Karman boundary conditions (i.e., periodic boundary conditions). (Of course, this analysis may be generalized to other types of boundary conditions.) In this case, the index m used above to label the modes can be identified with {n, k, σ}, where n is the band-index, k is the wave vector of each Bloch mode (k lies inside the First Brillouin Zone), and σ labels the polarization (σ=1 and σ=2 for s-polarization and p-polarization, respectively). In addition, since the system is finite, k can only take discrete values: $k = 2\pi \times (n_x/L_x, n_y/L_y, n_z/L_z)$ for the homogeneous and band-edge cases, and $k=2\pi\times(n_x/L_x, n_y/L_y, 0)$ for the Dirac case (in all three cases, $n_x$, $n_y$, and $n_z$ are arbitrary integers). Thus, once the normal modes of the system $E_{n,k,\sigma}$ are computed (e.g., using the plane-wave expansion method to Maxwells equations), from Eqs. (8) and (9) the β factor can be calculated from $$\beta = \frac{\omega_t g(\omega_t)|E_t(r)\cdot\hat{d}|^2}{\int d\omega g(\omega)\omega\left\{\sum_{n,k,\sigma}\delta(\omega-\omega_{n,k,\sigma})|E_{n,k,\sigma}(r)\cdot\hat{d}|^2\right\}} \quad (11)$$

In the limit in which the system's volume $V \gg \lambda^3$ (or equivalently, for the Dirac case, when the area $A \gg \lambda^2$), where λ is the central emission wavelength, semi-analytical expressions for the β-factor can be obtained by assuming a continuous distribution of wave vectors over the First Brillouin Zone. Specifically, one can replace summation over k with an integral over the First Brillouin Zone with respect to k scaled by the volume V in the homogeneous and band-edge cases. This integral is scaled by the area A in the Dirac case. (In all three cases the integral over k is performed over the whole First Brillouin Zone.) Then, by expanding the argument of the Dirac delta appearing in the denominator of the right-hand side of Eq. (11) using $$\omega - \omega_{n,\sigma}(k_0) = \nabla_{k_0}\omega[k_0 - k_0(\omega_{n,\sigma})] + O(|k_0 - k_0(\omega_{n,\sigma})|^2) \quad (12)$$

and neglecting the contribution of second order terms in $|k_0 - k_0(\omega_{n,\sigma})|$, one can rewrite Eq. (11) as:

$$\beta = \frac{1}{V}\frac{\omega_s g(\omega_s)}{\int d\omega g(\omega)\omega\tilde{\rho}(\omega)} \quad (13)$$

where the function ρ(ω) determines the total density of photonic states per unit volume in the structure. Note that in the Dirac case, the volume V is replaced by the transversal area A. In analogy with standard analyses in solid-state physics, in the homogeneous and band-edge cases, ρ(ω) can be expressed as $$\tilde{\rho}(\omega) = \frac{1}{(2\pi)^3}\int_{A(\omega_s)}\frac{1}{v_g}dk_t \quad (14)$$

where $A(\omega_s)$ denotes the equifrequency surface $\omega=\omega_s$, and $v_g$ is the magnitude of the group velocity $v_g=|d\omega/dk|$. At each point of the equifrequency surface, $k_t$ stands for the component of the 3D vector k that lies along the tangential direction to $A(\omega)_s$ at each point of the k-space. In the Dirac case a similar expression holds for ρ(ω), but now the domain of integration in Eq. (14) is an equifrequency curve instead of an equifrequency surface. The resulting expression(s) for ρ(ω), obtained by performing the integral defined by Eq. (14) for the different dispersion relations considered in this work, are discussed in detail above.

Eq. (13) is based in part on the assumption that, for the range of parameters considered here, the emission bandwidth is narrow enough so that $|E_{nk\sigma}(r)|^2 \approx |E_t(r)|^2$ for all modes whose equifrequencies lie inside the interval where the source's emission linewidth is not negligible. Probing the LDOS of the 2D counterpart of the defect layer structure shown in FIG. 2 makes it possible to verify numerically the accuracy of this approximation in the Dirac case (a similar analysis holds for the band-edge case). This can be done by computing the power radiated by a dipole placed in the low-refractive index regions of the structure (the interstitial regions among cylinders). This power can be computed by employing a generalization of the conventional coupled-mode theory, in which each Bloch mode is considered as an independent input/output channel.

Figures 7A, 7B:
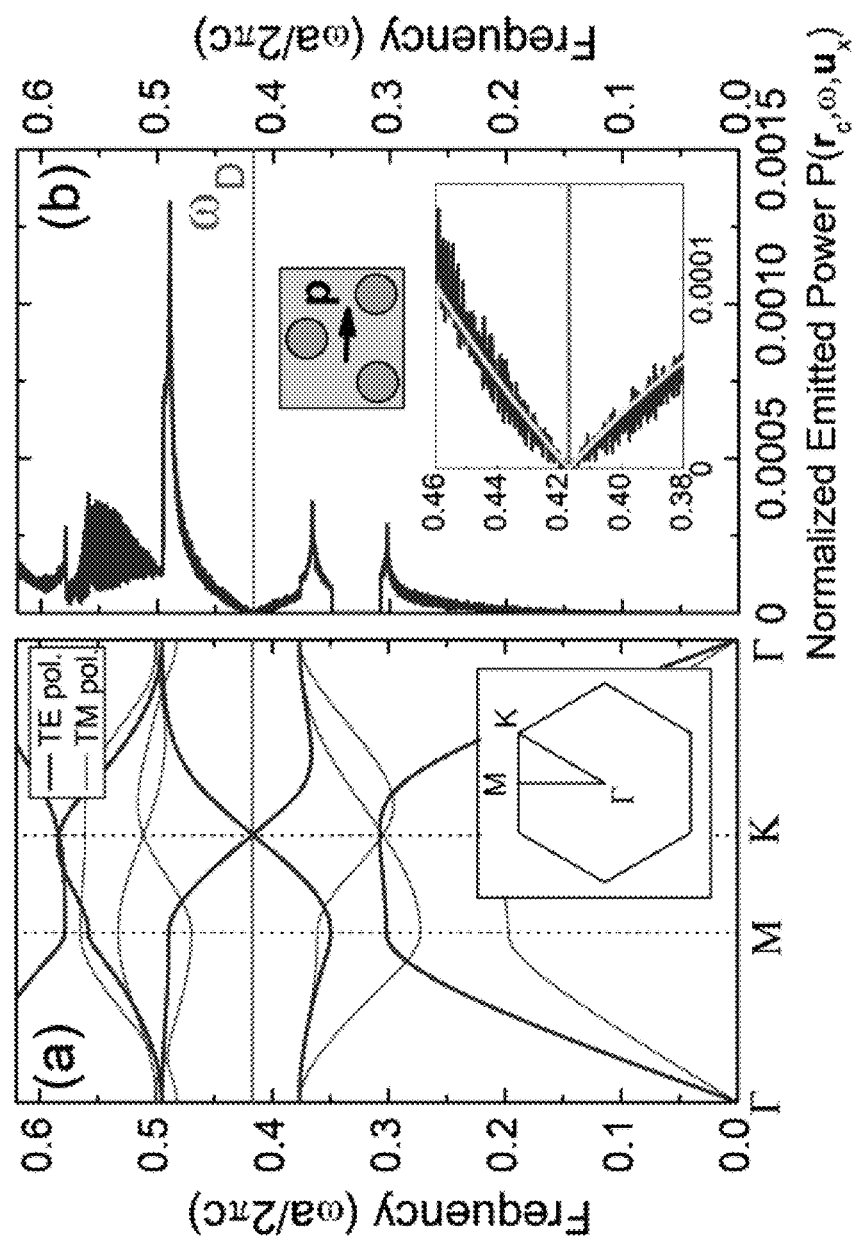
FIG. 7A illustrates the photonic band structure of a model of a defect plane containing an isolated Dirac point at K.
FIG. 7B is a plot of emission spectrum of a dipole located at the center of the unit cell of the photonic crystal model used in FIG. 7A whose dipolar moment points along the x-axis (upper inset); the lower inset shows a comparison between the predictions of semi-analytical and full numerical calculations for the emitted power.

FIG. 7A illustrates a numerical calculation of two-dimensional photonic band structure displaying an isolated Dirac point. This photonic band structure is for a system formed by a two-dimensional triangular lattice of dielectric cylinders of refractive index $n_d=3.1$ and radius $r_d=0.32a$ (α is the lattice constant) embedded in air. The Dirac point is at a wave vector associated with the K point and a normalized frequency of about 0.41 (marked the intersection of the diagonal bands (solid lines), the gray horizontal line, and the dotted vertical line). This Dirac point is separated from all of the other bands in the photonic band structure.

FIG. 7B is a plot of (normalized) power emitted by a dipole (e.g., a quantum dot, organic molecule, or other source) located at the center of the unit cell of the two-dimensional triangular lattice considered in FIG. 7A with its dipolar moment pointing along the x-axis. The upper inset in FIG. 7B illustrates the dipole's orientation. The lower inset in FIG. 7B shows a comparison between the predictions of semi-analytical and full numerical calculations for the emitted power. In both FIGS. 7A and 7B, $\omega_D$ marks the frequency of the Dirac point.

FIG. 7B shows that the radiated power's frequency dependence near the Dirac frequency $\omega_D$ (and hence the LDOS), obtained by assuming $|E_{nk\sigma}(r)|^2 \approx |E_t(r)|^2$, agrees well with full numerical calculations within a moderately large bandwidth of frequencies. Although the dipole considered here is at the center of the unit cell of the triangular lattice, with the dipole pointing along the x-direction, similar agreement between numerical and semi-analytical results occur for other dipole positions within the unit cell, as well as for other dipole orientations.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus comprising:
 a face-centered cubic (fcc) structure having a photonic band structure exhibiting at least one Dirac cone, the fcc structure comprising:
  at least one first layer of first dielectric material having a plurality of rods with respective longitudinal axes oriented along a [111] direction of the fcc structure arrayed on a first triangular lattice having a lattice constant $\alpha$;
  at least one second layer of second dielectric material having a plurality of holes with respective longitudinal axes oriented along the [111] direction of the fcc structure arrayed on a second triangular lattice having the lattice constant $\alpha$; and
  a defect layer in the fcc structure to confine an electromagnetic wave along a plane perpendicular to the [111] direction of the fcc structure.

2. The apparatus of claim 1, wherein the fcc structure is configured to emit at least a portion of the electromagnetic wave via a surface parallel to a (111) plane of the fcc structure.

3. The apparatus of claim 1, wherein the fcc structure is configured to emit at least a portion of the electromagnetic wave as a single transverse mode.

4. The apparatus of claim 1, wherein the fcc structure is characterized by at least one lattice vector $(1, 1, \delta)\alpha/2$, $(1, \delta, 1)\alpha/2$, and $(\delta, 1, 1)\mathbf{60}/2$, $|\delta|<0.1$.

5. The apparatus of claim 1, wherein the Dirac cone is separated from all other bands in the photonic band structure of the fcc structure.

6. The apparatus of claim 1, wherein:
 the plurality of rods comprises at least one rod having at least one of a circular cross section, an elliptical cross section, a triangular cross section, a square cross section, a rectangular cross section, and a hexagonal cross section; and
 the plurality of holes comprises at least one hole having at least one of a circular cross section, an elliptical cross section, a triangular cross section, a square cross section, a rectangular cross section, and a hexagonal cross section.

7. The apparatus of claim 1, wherein the first triangular lattice is offset from the second triangular lattice.

8. The apparatus of claim 1, wherein the defect layer is disposed in contact with at least one of a pair of first layers and a pair of second layers.

9. The apparatus of claim 1, wherein the defect layer perturbs a periodicity of the fcc structure along a [111] direction of the fcc structure.

10. The apparatus of claim 1, wherein the defect layer defines at least one edge configured to couple at least a portion of the electromagnetic wave substantially confined to the defect layer out of the defect layer.

11. The apparatus of claim 1, further comprising:
 a gain medium, electromagnetically coupled to the defect layer, to emit at least one photon into the defect layer.

12. The apparatus of claim 11, where the gain medium comprises at least one of:
 a quantum well disposed in the defect layer;
 a quantum dot disposed in the defect layer;
 an organic dye molecule disposed in the defect layer;
 an organic semiconductor disposed in the defect layer;
 a rare-earth material disposed in the defect layer; and
 graphene disposed in the defect layer.

13. The apparatus of claim 11, wherein the gain medium has an emission linewidth $\Delta\omega/\omega$ and the defect layer has a surface area of about $(\omega/\Delta\omega)^2\alpha^2$.

14. The apparatus of claim 1, further comprising:
 a waveguide, disposed in the fcc structure and electromagnetically coupled to the defect layer, to couple at least a portion of the electromagnetic wave substantially confined to the defect layer out of the defect layer.

15. The apparatus of claim 1, further comprising:
 a reflector, disposed along at least a portion of an edge of the defect layer, to reflect at least a portion of the electromagnetic wave in a direction substantially perpendicular to the [111] direction of the fcc structure.

16. The apparatus of claim 15, wherein the defect layer and the reflector form a resonator to confine the at least a portion of the electromagnetic wave within a (111) plane of the fcc structure.

17. A method of fabricating a photonic device, the method comprising:
 (A) forming a plurality of first layers comprising at least one first layer having a plurality of rods arrayed on a first triangular lattice characterized by a lattice constant $\alpha$;
 (B) forming a plurality of second layers interleaved with the plurality of first layers so as to form a face-centered cubic (fcc) structure, the plurality of second layers comprising at least one second layer having a plurality of holes arrayed on a second triangular lattice characterized by the lattice constant $\alpha$; and
 (C) forming a defect layer in the fcc structure so as to introduce a Dirac cone into a photonic band structure of the fcc structure.

18. The method of claim 17, wherein the Dirac cone dispersion is separated from all other bands in the photonic band structure of the fcc structure.

* * * * *